United States Patent [19]

Baron

[11] Patent Number: 4,600,033

[45] Date of Patent: Jul. 15, 1986

[54] GUARD FOR GAS CYLINDER VALVE

[76] Inventor: Michael Baron, 460 Dumoulin Street, Winnipeg, Manitoba, Canada, R2J 0B5

[21] Appl. No.: 661,898

[22] Filed: Oct. 17, 1984

[30] Foreign Application Priority Data

Nov. 17, 1983 [CA] Canada .................................. 441355

[51] Int. Cl.[4] .............................................. F16L 35/00

[52] U.S. Cl. .................................. 137/382; 220/85 P

[58] Field of Search .............. 137/377, 382; 220/85 P, 220/375, 379; 285/45

[56] References Cited

U.S. PATENT DOCUMENTS

| | | | |
|---|---|---|---|
| D. 273,510 | 4/1984 | Mayor | 220/85 P |
| 1,353,050 | 9/1920 | Lambrakos | 220/85 P |
| 2,216,717 | 10/1940 | Alessio | 220/85 P |
| 2,278,232 | 3/1942 | Anderson | 220/85 P |
| 2,295,898 | 9/1942 | Thompson | 220/375 |
| 3,899,132 | 8/1975 | Grobbelaar | 137/355.16 |
| 3,958,716 | 5/1976 | Korte | 137/382 |
| 4,174,107 | 11/1979 | Hickey | 220/375 |
| 4,380,247 | 4/1983 | Douglas | 137/382 |
| 4,420,013 | 12/1983 | DiBlasio | 137/382 |
| 4,432,120 | 2/1984 | Sherman, Jr. et al. | 220/375 |

FOREIGN PATENT DOCUMENTS

| | | | |
|---|---|---|---|
| 399302 | 7/1924 | France | 220/85 P |

*Primary Examiner*—Martin P. Schwadron

*Assistant Examiner*—Sheri M. Novack

*Attorney, Agent, or Firm*—Stanley G. Ade; Adrian D. Battison

[57] ABSTRACT

A guard for attachment to the end of a cylinder of compressed gas comprises a cylindrical portion of diameter approximating the diameter of the intended cylinder and a pair of flanges extending outwardly from the cylindrical portion and contiguous therewith and defining between the flanges a space through which access can be obtained to the interior of the guard for observing and operating upon the valve arrangement of the cylinder. The cylindrical portion is clamped around the cylinder by drawing together the flanges by a pair of bolts extending across the flanges with spaces for defining the minimum space between the flanges. Openings in the cylindrical portion provide handles and access to the interior. The end of the cylindrical portion is open. A chain for supporting the guard and cylinder is attached to the guard and hooks are mounted on the flanges for receiving the hose from the cylinder.

15 Claims, 4 Drawing Figures

GUARD FOR GAS CYLINDER VALVE

BACKGROUND OF THE INVENTION

This invention relates to a guard for the valve, gauge and regulator of a cylinder of compressed gas. Such cylinders of compressed gas are in their body very resistant to damage but in the area of the connection of the valve and gauge to the body of the cylinder they are vulnerable to damage. Thus if impacted in this area by a fall or by a moving body, the valve or gauge and also the regulator which is positioned in this area can become damaged allowing gas to escape from the cylinder. This is dangerous firstly because the gas can itself be explosive and secondly because the gas can be under such high pressure that its escape can propel the cylinder in the opposite direction to the escape. Both of these dangers can of course have catastrophic results.

A number of proposals have been made for providing protective guards for the valve area of cylinders of this type. Most of these guards, however, completely surround the valve area and must be opened or removed before access to the valve can be obtained. Such an arrangement is acceptable in theory but in practice the guard in the working enviroment is often left off or left open thus rendering it totally ineffective.

Other proposals have been made for simple bars or rings surrounding the valve area but these are unacceptable in that they do not provide sufficient protection against the most dangerous situations where the valve, gauge and regulator fall against an elongate or pointed object where the whole of the impact is taken on the valve area.

SUMMARY OF THE INVENTION

It is one object of the present invention therefore to provide an improved guard for a cylinder of compressed gas which provides access to the valve area without removing the guard and yet provides effective protection against impact on the valve.

The invention therefore provides according to a first aspect a guard for a cylinder for compressed gas having a valve, gauge and regulator at one end, the guard comprising a sleeve member having a cylindrical position for surrounding the majority of the peripheral extent of the cylinder leaving an opening extending axially of the cylindrical portion and two spaced flanges on respective sides of the opening and extending axially of the cylindrical portion and outwardly therefrom, and means for clamping the cylindrical portion around the end of the cylinder such that a portion of the sleeve member extends axially beyond the end of the cylinder to surround and protect the valve, gauge and regulator.

In accordance with a second aspect of the invention there is provided the combination of a cylinder for compressed gas having a valve, gauge and regulator at one end and a guard attached to said one end of the cylinder for surrounding and protecting the valve, gauge and regulator the guard comprising a sleeve member having a cylindrical portion for surrounding the majority of the peripheral extent of the cylinder leaving an opening extending axially of the cylinder and two spaced flanges on respective sides of the opening and extending axially of the cylinder and outwardly therefrom, and means for clamping the cylindrical portion around the end of the cylinder such that a portion of the sleeve member extends axially beyond the end of the cylinder.

The invention has the advantage, firstly, therefore that the cylindrical portion of the sleeve member substantially completely surrounds the valve area extending axially from the end of the cylinder but leaves a space between the flanges for access to the valve without the guard being removed or in anyway tampered with. The flanges which extend outwardly from the cylindrical portion protect the space through which access is achieved and preferably extend the full length of the cylindrical portion to provide protection along the full length.

According to a further advantage of the invention, the end of the sleeve member remote from the cylinder can be open so as to provide further access and in addition a further opening in one side of the cylindrical portion can be provided which acts as a handle and also as further access to the valve area without significantly reducing the protection provided by the sleeve member.

In accordance with a yet further advantage of the invention the valve and cylindrical portion can be formed contiguously from a bent sheet of galvanized mild steel so that the flanges lie directly on either side of the space and define the space. Spacer bars extending across between the flanges can reinforce the spacing of the flanges and provide yet further protection for the space between the flanges.

In accordance with a yet further feature of the invention, the clamping means can be obtained simply by clamping together the flanges at the end of the sleeve member adjacent the cylinder so that the cylindrical portion is clamped around the cylinder by drawing the flanges together.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
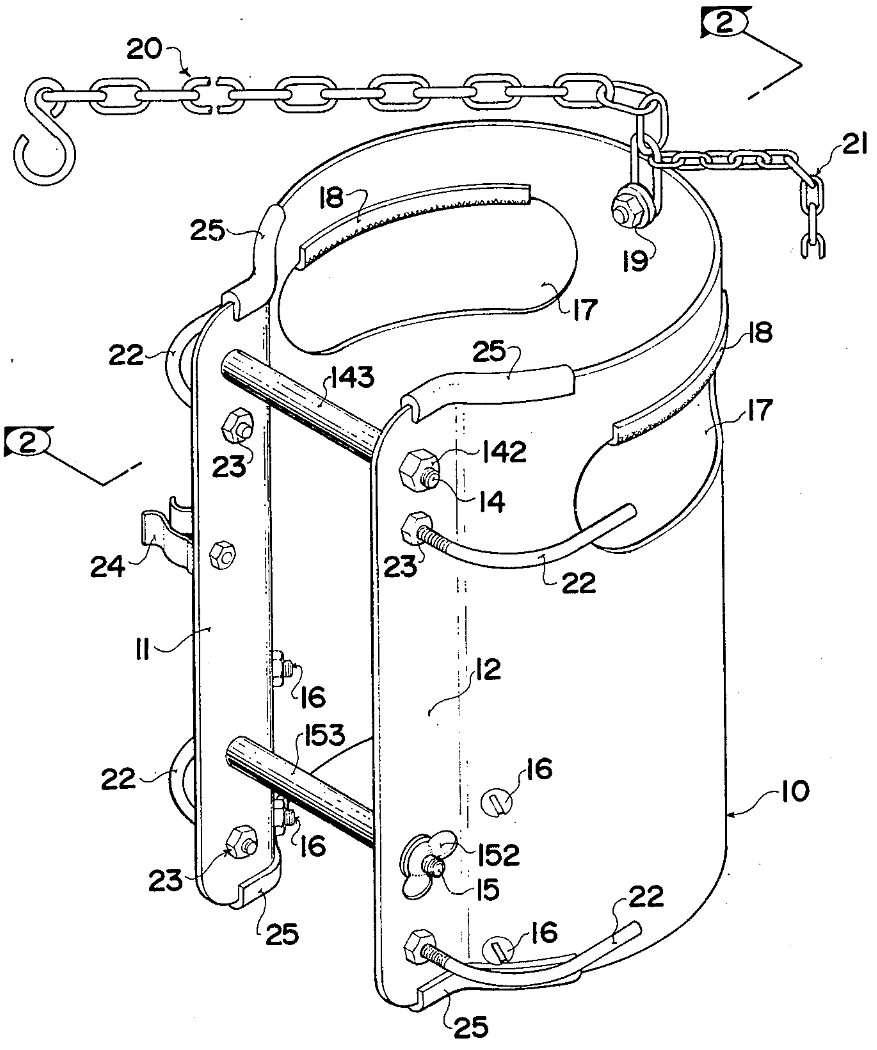
FIG. 1 is an isometric view of a first embodiment of a guard for use with a large diameter cylinder.

The guard of FIG. 1 comprises basically a sleeve formed from a single sheet of galvanized mild steel bent to form a part cylindrical portion 10 with two flanges bent out from the ends of the cylindrical portion 10 and indicated at 11 and 12 respectively. The flanges 11, 12 are spaced by a distance of the order of 3 ½ inches and which is greater than the width of a hand so as to provide access through the space between the two flanges to the interior of the cylindrical portion.

Figure 2:
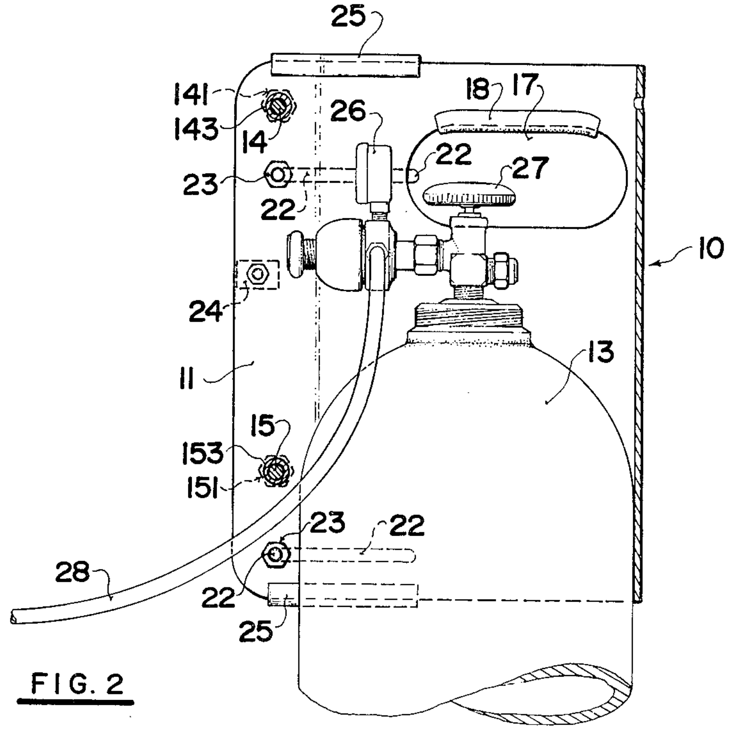
FIG. 2 is a cross sectional view along the lines 2—2 of FIG. 1 showing the guard attached to a cylinder.

The sleeve as a whole is cut and shaped so the cylindrical portion 10 approximates in diameter to the diameter of the intended cylinder shown in FIG. 2 and indicated at 13. The flanges can be drawn together by nut and bolt couplings 14, 15 which are arranged such that the bolt 141, 151 passes through both flanges for receiving nuts 142, 152 which can be screwed onto the bolt to draw the flanges 11 and 12 together. The nut 142 can comprise a simple hex nut but the nut 152 is most preferably a wing nut so that the spacing of the flanges at the bottom adjacent the cylinder can be readily adjusted to draw the flanges together and thus reduce the diameter of the cylindrical portion 10 so as to clamp the cylindrical portion around the top of the cylinder. The nut and bolt arrangement 15, therefore, acts as a clamping device and firmly grasps the upper section of the cylinder.

For use with cylinders of a slightly smaller diameter than the diameter of the cylindrical portion 10 particularly in cases where the regulator extends outwardly beyond the cylindrical extent of the cylinder, a plurality of nuts and bolts 16 is provided each being arranged to pass through a respective hole in the cylindrical portion and engage the outer surface of the cylinder. Two of the nuts are arranged adjacent one flange and two adjacent the other flange so that by adjusting the position of the nut on the bolt the extent of the bolt projecting towards the cylinder can be adjusted so as to clamp the top of the cylinder between the cylindrical portion remote from the flanges and the bolt 16 under pressure caused by drawing the flanges together by the bolt 15.

A pair of openings 17 is provided in the cylindrical portion adjacent the top thereof and extending around the periphery over an angular extent of the order of 90°. The upper side of the openings is straight and both lie in the same horizontal plane. Both of the upper sides carry a hand grip section 18 which is provided by a folded strip of resilient material wrapped around the edge so as to provide a smooth surface by which a user can grasp the guard for the purpose of lifting the guard and cylinder for transportation. The openings are both of sufficient extent to receive the hand of the user and in addition extend downwardly a distance sufficient to comfortably receive the fingers of the user and also to provide some access to the interior of the guard. In the embodiment of FIG. 1 the openings 17 are arranged symmetrically of an axis passing through the guard between the flanges 11, 12 and are spaced by a shorter distance at the ends remote from the flanges.

Lying on the axis of symmetry at the front upper edge of the cylindrical portion 10 is a bolt and nut 19 which attaches a chain 20 to the front of the guard. The chain 20 is of relatively heavy-duty construction and provides a length of the order of two to three feet and has a hook on the remote end so the chain can be hooked over a suitable support for the guard and attached cylinder to retain the cylinder in a required position or orientation without the danger of falling. For convenience but not shown in FIG. 1, the chain can be wrapped around the guard between the two openings 17 when not in use.

A second small chain of only a few inches in length is also attached to the guard adjacent this point and this can be used to hang the valve key wrench to prevent it being separated from the cylinder and to retain it in a suitable place for use.

Four hooks 22 are positioned on the flanges facing outwardly and curved toward the cylindrical portion are provided attached to the outer surface of the flanges 11 and 12. These hooks are provided by simple rods threaded at the inner end for attachment by nuts 23 to the flange. The hooks 22 provide a suitable location around which the hose from the cylinder can be wrapped with the handle of the torch secured in a hose clip 24 also attached to the outer face of one of the flanges 11.

A flexible folded edge strip 25 is positioned on the edge of the sleeve member covering the junction between each flange and the cylindrical portion and extending a short distance into the flange and into the cylindrical portion. The edge strip is of a conventional form formed from a metal coated channel-shaped rubber or resilient material which can be secured to the edge of the sleeve by adhesive. The edge strips 25 prevent the hose from being pinched by the edge of the sleeve or from vigorously rubbing on the sleeve in use and thus causing damage or wear to the hose with the consequent danger of escape of the gas.

The arrangement of the valve, regulator and pressure gauge is illustrated in FIG. 2 where it will be noted that the pressure gauge and regulator are accessible through the opening between the flanges 11 and 12 so the pressure can be easily read through the opening without in anyway removing or adjusting the position of the guard. The gauge and regulator are generally indicated at 26. In addition the valve 27 is readily accessible from the open top of the guard so that it can be opened and closed merely by reaching into the open top of the guard. The hose extends from the regulator downwardly and is wrapped under the bar 153 to prevent it being torn from its mount on the regulator.

It will be appreciated therefore that the guard provided by the flanges 11 and 12 on the cylindrical portion 10 provides a complete protection for the valve arrangement at the top of the cylinder 13 with particularly the outwardly extending flanges providing protection for the vulnerable area of the opening in the cylindrical portion 10 through which the access to the pressure gauge and regulator is obtained. In addition the bars or bolts 14, 15 each of which carries a spacer sleeve 143, 153 locate the flanges in the proper position and also provide additional protection for the space between the flanges. Particularly the upper bolt 14 and sleeve 143 protect the area between the open top and the opening between the flanges and prevent an elongate body from entering across the corner between those two openings.

The flanges 11 and 12 provide strength to the upper edge of the cylindrical portion 10 so that it is more resistant to bending inwardly from impact with solid objects.

Figure 4:
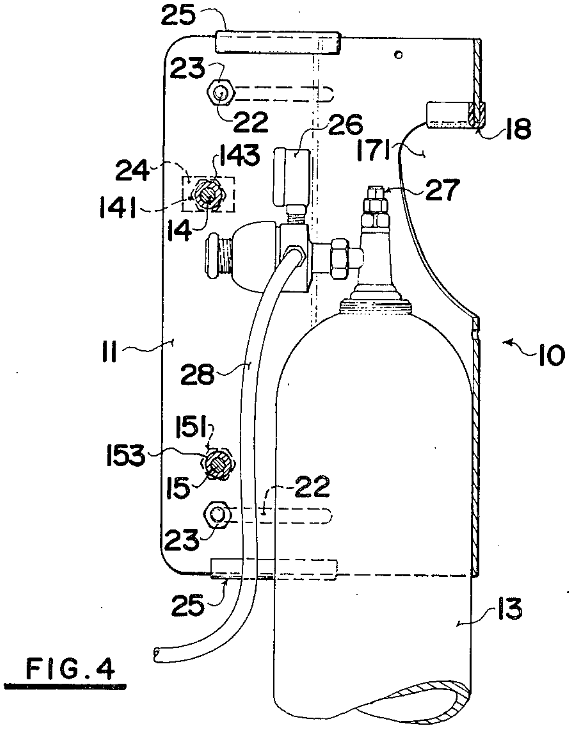
FIG. 4 is a cross sectional view along the lines 4—4 of FIG. 3 showing the guard attached to a cylinder.
Figure 3:
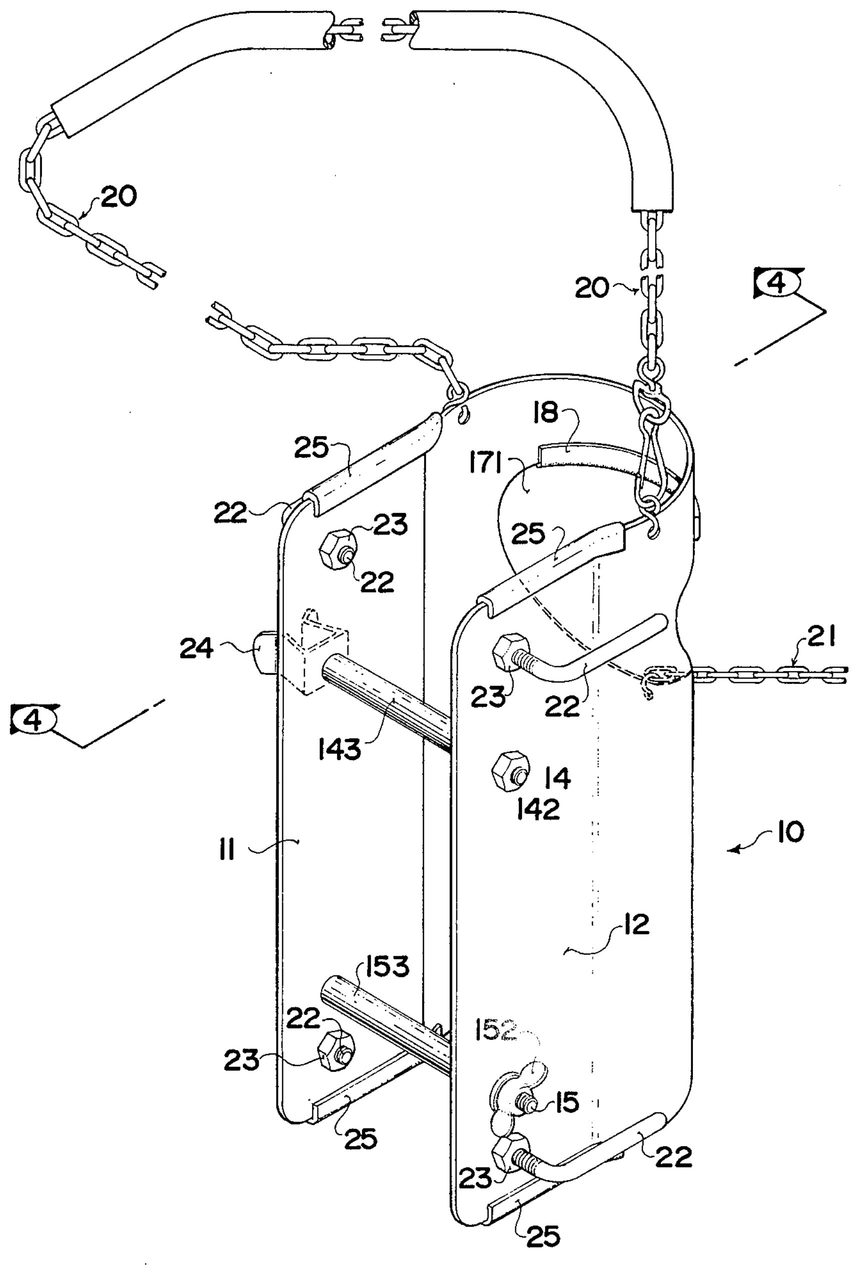
FIG. 3 is an isometric view similar to that of FIG. 1 showing a second embodiment for use with smaller diameter cylinders.

Turning now to FIGS. 3 and 4, a modified guard arrangement for use with smaller diameter cylinders is shown. Generally it is of similar construction to the previous embodiment in that it comprises a pair of flanges 11 and 12 and a cylindrical portion 10. However in this case the cylindrical portion 10 is of reduced diameter to match the diameter of the intended cylinder and the flanges 11 and 12 are of increased width so as to extend further outwardly from the edge of the cylindrical portion 10 to provide effectively equal protection for the valve, gauge and regulator relative to the embodiment of FIG. 1 despite the reduced diameter of the cylindrical portion 10.

In addition this embodiment is modified in that in place of the two openings 17, a single opening 171 is provided centrally of the cylindrical portion 10 and opposite the space between the flanges 11 and 12. The opening provides a flat horizontal upper edge for receiving a folded edge section 18 of the same construction as that of FIG. 1 so as to provide a hand grip by which the guard and the cylinder can be lifted. A second hand grip can be provided by the upper bolt arrangement 14 of similar construction to that of FIG. 1. The remaining edges of the opening 171 provide a pear-shape that is there is a downwardly extending portion at the center of the opening and this provides access to the valve as shown in FIG. 4 which on the smaller cylinders is arranged on a Y coupling with the valve extending toward the pear-shaped opening and the gauge and regulator extending toward the opening between the flanges 11 and 12. Thus the valve is accessible by the hand of the operative through the opening 171.

The embodiment of FIG. 3 and 4 is further modified in that the chain 20 instead of being connected at one point centrally of the guard is attached at two spaced points either side of the axis of symmetry and is arranged to hang downwardly with a tube of plastic material covering the chain at a central location to enable the chain to be grasped by hand and lifted more comfortably. This modification also allows the cylinder and guard to be suspended from the shoulder of the user for ready transportation to a place of use and to be carried during use.

A further modification is provided in that the hooks 22 instead of being curved include a right angle bend so as to lie substantially parallel to the respective flange 11, 12. This modification is in view of the reduced outward curvature of the cylindrical portion 10 relative to the flanges 11 and 12.

The embodiment is further modified in that the chain 21 instead of being attached to the chain 20 is attached centrally of the guard through a small hole at the bottom of the opening 171. In a final minor modification, the hose clip 24 instead of being attached to a separate bolt and nut coupling is received on the end of the bolt 14 and the bolt 14 is positioned lower on the flanges 11, 12 than in the previous embodiment. The bolt 14 is thus positioned adjacent the gauge and regulator to protect them from damage while they are accessible through the space between the flanges.

In both embodiments the space between the flanges 11, 12 is of the order of the width of the operative's hand to allow access and to allow grasping of the bolts and covering sleeves 14, 143. Such a spacing is of the order of three inches. Thus in the first embodiment the cylindrical portion 10 has a diameter of the order of twice the space between the flanges whereas in the second embodiment the diameter of the cylindrical portion is only slightly greater than the spacing between the flanges since these dimensions are set by different criteria.

Since various modifications can be made in my invention as hereinabove described, and many apparently widely different embodiments of same made within the scope of the claims without departing from such spirit and scope, it is intended that all matter contained in the accompanying specification shall be interpreted as illustrative only and not in a limiting sense.

I claim:

1. A guard for a cylinder for compressed gas having a valve, gauge and regulator at one end, the guard comprising a sleeve member having a part circular cylindrical portion having a diameter substantially equal to the outside diameter of the cylinder and having longitudinal edges defining an axially opening whereby the part cylindrical portion surrounds the majority of the peripheral extent of the cylinder and two spaced flanges arranged at said longitudinal edges on respective sides of the opening and extending axially of the cylindrical portion and outwardly therefrom, said cylindrical portion and flanges being formed from a single sheet of rigid material such that the flanges are formed contiguously with and are bent outwardly from the cylindrical portion, said flanges extending substantially the full length of the cylindrical portion, and means for releasably clamping the cylindrical portion around the end of the cylinder such that a part of the cylindrical portion and flanges extends axially beyond the end of the cylinder, the spacing between the flanges and the outward extent thereof being sufficient to receive the regulator and gauge therein whereby the axially extending part of the cylindrical portion and flanges acts to protect the valve, gauge and regulator.

2. The invention according to claim 1 wherein the clamping means comprises means for pulling the flanges closer together.

3. The invention acccording to claim 2 wherein the clamping means comprises a bolt and wing nut with the bolt extending through both flanges such that the wing nut acts to draw the flanges together.

4. The invention according to claim 1 including two spacers spaced axially of the flanges and each extending across between the two flanges so as to reinforce the spacing of the two flanges.

5. The invention according to claim 1 wherein the flanges are spaced by more than half the diameter of the cylindrical portion.

6. The invention according to claim 1 wherein the flanges are spaced by more than three inches.

7. The invention according to claim 1 wherein the sleeve member is formed from a single sheet of galvanized mild steel.

8. The invention according to claim 1 wherein the cylindrical portion has an opening in the side thereof spaced from the flanges.

9. The invention according to claim 8 wherein one side of the opening remote from the clamping means and at right angles to the axis of the cylindrical portion is of sufficient extent to receive the hand of an operative and wherein there is provided hand grip means on said side.

10. The invention according to claim 8 wherein the opening is pear-shaped with the narrow end of the pear-shape extending axially toward the clamping means.

11. The invention according to claim 1 including hook members secured to the flanges and arranged such that a supply hose of the cylinder can be wrapped therearound.

12. The invention according to claim 11 wherein each flange carries two hook members each bent so as to extend firstly at right angles out from the flange and then parallel to the flange toward the cylindrical portion.

13. The invention according to claim 11 including a hose clip attached to one of the flanges for receiving the end of the supply hose.

14. The invention according to claim 1 wherein the end of the sleeve member remote from the cylinder is open to provide access to the valve, gauge and regulator.

15. The invention according to claim 1 including two flexible support members attached to the sleeve member, one heavier and longer than the other for supporting the guard and cylinder relative to a suitable support member and the other lighter shorter member being arranged for supporting an actuating key.

* * * * *